United States Patent
Rabe et al.

(10) Patent No.: US 6,382,587 B1
(45) Date of Patent: May 7, 2002

(54) FLUID CONTROL VALVE

(75) Inventors: Jerry Rabe, Holland; Christopher R. Helmer; Libby Williams, both of Hudsonville, all of MI (US)

(73) Assignee: BLD Products, Ltd., Holland, MI (US)

( * ) Notice: Subject to any disclaimer, the term of this patent is extended or adjusted under 35 U.S.C. 154(b) by 0 days.

(21) Appl. No.: 09/571,996

(22) Filed: May 16, 2000

Related U.S. Application Data

(60) Provisional application No. 60/134,554, filed on May 17, 1999.

(51) Int. Cl.⁷ .................................................. F16K 1/00
(52) U.S. Cl. ......................................... 251/86; 251/318
(58) Field of Search ........................ 251/86, 318, 30.03

(56) References Cited

U.S. PATENT DOCUMENTS

| | | |
|---|---|---|
| 4,360,161 A | 11/1982 | Claxton et al. |
| 4,378,766 A | 4/1983 | Yamazoe et al. |
| 4,383,546 A | 5/1983 | Walters, Jr. |
| 4,480,614 A | 11/1984 | Kobashi et al. |
| 4,593,881 A | 6/1986 | Yoshino |
| 4,617,889 A | 10/1986 | Nishimiya et al. |
| 4,725,040 A | 2/1988 | Fornuto et al. |
| 4,813,647 A | 3/1989 | Yagi et al. |
| 4,823,750 A | 4/1989 | Niida et al. |
| 5,188,073 A | 2/1993 | Ejiri et al. |
| 6,095,490 A | * 8/2000 | Nakano et al. ......... 251/129.17 |
| 6,213,447 B1 | * 4/2001 | Bircann et al. ................ 251/86 |

FOREIGN PATENT DOCUMENTS

| | | |
|---|---|---|
| DE | 34 10993 A1 | 9/1985 |
| EP | 0 229 315 | 7/1987 |
| GB | 1 563 500 | 3/1980 |
| JP | 56-94079 | 7/1981 |
| JP | 64-24133 | 1/1989 |

\* cited by examiner

*Primary Examiner*—John Fox
(74) *Attorney, Agent, or Firm*—McGarry Bair, LLP

(57) ABSTRACT

A fluid control valve comprising a valve housing in which there is a reciprocating shaft on which is mounted a valve body that is brought into and out of contact with respect to a valve seat disposed within a fluid flow passage to permit or prevent fluid flow through the passage. The valve includes a vibration retarding mechanism comprising a sleeve mounted on the shaft and a guide mounted to the housing with an axial opening sized to receive the sleeve. Either the sleeve or guide has slots and the other has corresponding grooves that receive the slots to limit the radial movement of the shaft to retard or dampen reciprocation-induced vibrations.

27 Claims, 3 Drawing Sheets

FLUID CONTROL VALVE

This application claims priority form U.S. provisional application No. 60/134,554, filed May 17, 1999.

BACKGROUND OF THE INVENTION

1. Field of the Invention

The invention relates to a fluid control valve having an axially reciprocating valve shaft on which is mounted a valve body that seals and unseals a passage within a fluid flow path; and, more particularly to a fluid control valve with a shaft guide for retarding or dampening reciprocation-induced vibrations.

2. Related Art

Fluid control valves are well known and are generally solenoid-actuated valves wherein a solenoid moves a valve shaft on which is mounted a valve body to bring the valve body into and out of contact with a valve seat within a fluid path to control the flow of fluid through the fluid path. Solenoid-actuated fluid control valves are often used to control the air in a bypass line around a throttle valve in an internal combustion engine for an automobile to improve the idle performance. The solenoid-actuated valve controls the flow of fluid between the atmospheric or high pressure side of the throttle valve and the low pressure or suction side of the throttle valve. At certain operational conditions, the engine can require a greater volume of air than can be passed through the throttle valve without increasing engine rpm. In these instances, the control valve opens the throttle valve bypass passage to permit increased air flow to the engine. The bypass passage and valve reduces the engine's tendency to otherwise continuously raise and lower the rpm to adjust the air flow, which is referred to as "searching." U.S. Pat. No. 4,360,161, issued Nov. 23, 1982, and U.S. Pat. No. 5,188,073, issued Feb. 23, 1993, are examples of this type of solenoid-actuated valve.

One particular problem associated with this type of solenoid-actuated valve is that the reciprocation of the shaft can induce shaft vibrations that can prevent the valve body from properly sealing with respect to the valve seat, resulting in unintended fluid flow between the high pressure and low pressure sides of the throttle valve. U.S. Pat. No. 5,188,073 discloses various spring designs for applying a transverse force directly to the valve shaft to dampen the reciprocation-induced vibrations. One disadvantage of the various spring solutions is that the spring is typically metal and is biased into direct contact with the reciprocating shaft, resulting in increased wearing or abrading of the shaft.

There is still a desire and need to dampen the vibrations of the axially-reciprocating shaft without unnecessary or undue wear of the shaft.

SUMMARY OF THE INVENTION

The invention relates to a valve for controlling the flow of fluid through a conduit having an upstream portion with a first fluid pressure and a downstream portion with a second fluid pressure. The valve comprises a valve housing defining a fluid passage having an inlet adapted to be fluidly connected to the upstream portion of the conduit and an outlet adapted to be fluidly connected to downstream portion of the conduit. A valve seat is disposed within the fluid passage along with a first annular bearing located on the upstream side of the valve seat and a second annular bearing located on the downstream side of the valve seat.

The valve further includes a valve assembly comprising an elongated shaft having a first end slidably mounted within the first annular bearing and a second end slidably mounted with the second annular bearing for reciprocal movement within the passage along a longitudinal axis of the elongated shaft. A valve body is mounted on the shaft and moved into and out of contact with the valve seat in response to the reciprocation of the shaft to fluidly close the passage when the valve body contacts the valve seat and fluidly open the passage when the valve body is spaced from the valve seat.

A dampening mechanism dampens the vibration of the shaft and comprises a guide mounted to the valve housing and having an inner surface defining a sleeve opening that is axially aligned with the shaft longitudinal axis and circumscribing the shaft. A sleeve is mounted to the shaft and has an outer surface shaped to be slidaby received within the sleeve opening. The movement of the shaft in a direction transverse from the shaft longitudinal axis results in contact between at least a portion of the sleeve and a portion of the guide to thereby retard the movement of the shaft in a direction other than along the shaft longitudinal axis.

Preferably, one of sleeve inner surface and guide outer surface has a rib projecting therefrom and the other of the sleeve inner surface and guide outer surface has a grooved formed therein, wherein the rib is received within the groove and the rib contacts a portion of the groove when the shaft moves in a direction transverse to the shaft longitudinal axis. The ribs and grooves comprise multiple pairs.

The groove has opposed diverging side walls to define a open top for the groove in which the rib is received. The cross-sectional width of the open top is greater than the cross-sectional width of the rib at the open top when the rib is received within the groove. A bottom wall preferably connects the diverging side walls to define the groove with a cross-sectional profile having an increasing width from the open top to the bottom wall.

The rib preferably has a substantially constant-width cross-sectional profile. The width of the groove has a minimum width portion and the rib has a cross-sectional width less than the groove minimum width.

In another aspect, the invention relates to a valve for controlling the flow of fluid through a conduit having an upstream portion with a first fluid pressure and a downstream portion with a second fluid pressure. The valve comprises a valve housing defining a fluid passage having an inlet adapted to be fluidly connected to the upstream portion of the conduit and an outlet adapted to be fluidly connected to downstream portion of the conduit. A valve seat is disposed within the fluid passage.

A valve assembly comprising an elongated shaft is slidably mounted to the housing for reciprocal movement within the passage along a longitudinal axis of the elongated shaft. A valve body is mounted on the shaft and moved into and out of contact with the valve seat in response to the reciprocation of the shaft to fluidly close the passage when the valve body contacts the valve seat and fluidly open the passage when the valve body is spaced from the valve seat.

A dampening mechanism is provided and comprises a guide mounted to the valve housing and having an inner surface defining a sleeve opening axially aligned with the shaft longitudinal axis and circumscribing the shaft in combination with a sleeve mounted to the shaft and having an outer surface shaped to be slidaby received within the sleeve opening. One of sleeve inner surface and guide outer surface has a rib projecting therefrom and the other of the sleeve inner surface and guide outer surface has a grooved formed therein. The rib is received within the groove contacts a portion of the groove when the shaft moves in a direction transverse to the shaft longitudinal axis to thereby retard the movement of the shaft in a direction other than along the shaft longitudinal axis.

DETAILED DESCRIPTION

Figure 1:
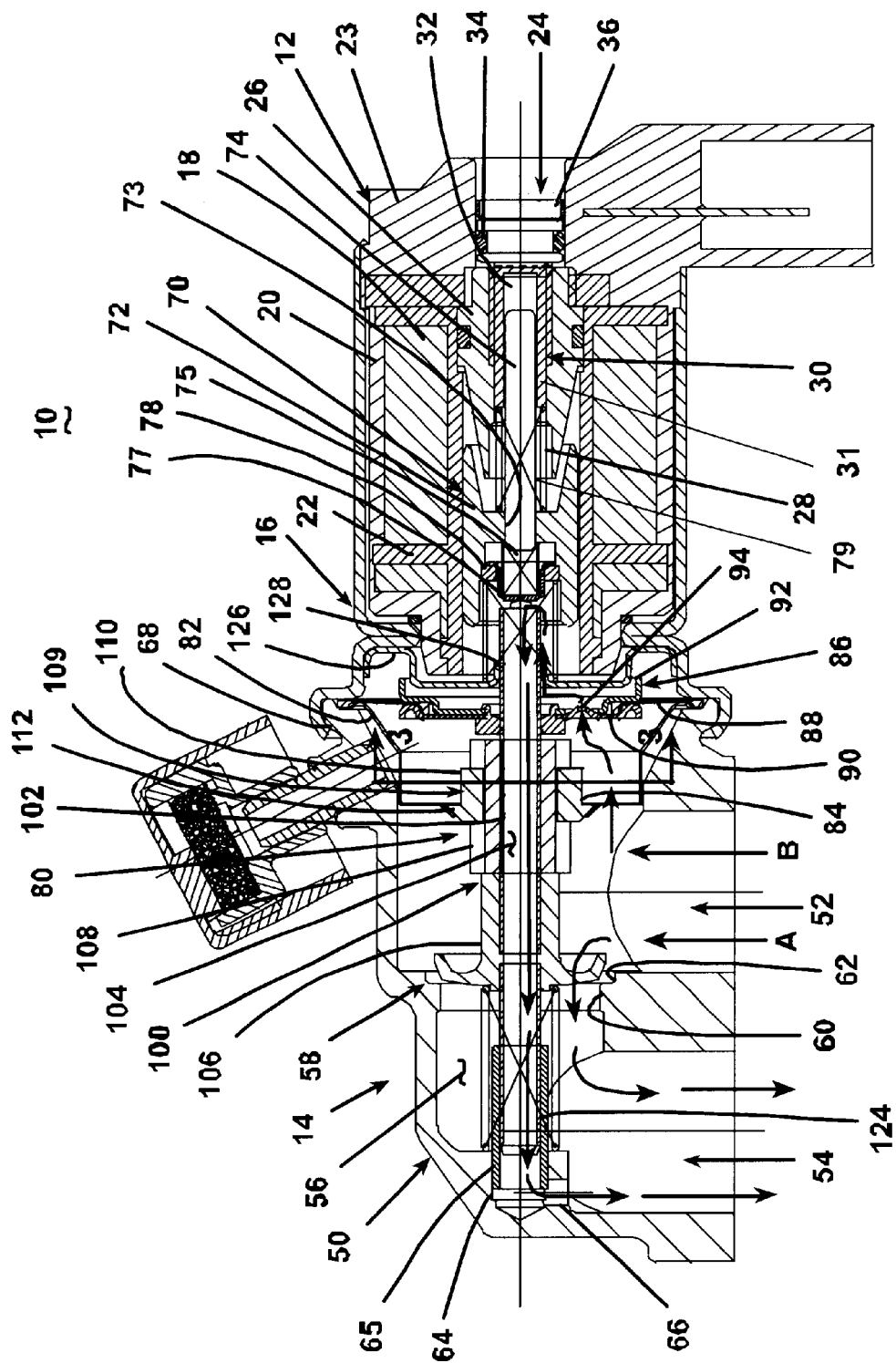
FIG. 1 is a longitudinal cross-sectional view of a control valve according to the invention.

FIG. 1 illustrates a solenoid-type fluid control valve 10 comprising a solenoid 12 and a valve 14 coupled together by a housing assembly 16.

The solenoid 12 has a well known construction and generally comprises an annular electrical coil 18 sandwiched between an outer casing 20 and an insulator 22, which defines an axial passage 24 extending through the annular coil 18. The outer casing 20 includes an electrical conductor 23. A guide mount 26 is fixedly positioned within the axial passage 24 and defines an axial pin opening 28 extending through the guide mount 26. An adjustment screw 30 is slidably received with in the pin passage 28 and includes an axial pin guide blind opening 32. An 0-ring 34 is positioned around the closed end of the adjustment screw 30 to seal the adjustment screw with respect to the electrical connector 23 and sealed by a dust cap 36.

The valve 14 comprises a housing 50 having an inlet opening 52 connected to an outlet opening 54 by a transverse passage 56 in which is formed a valve seat 58 defined by a raised annular rib 60 and a upstream step portion 62. A blind mounting opening 64 is formed on the closed end of the transverse chamber 56 and receives a tubular shaft guide or bearing 65. A bypass passage 66 fluidly connects the blind mounting opening 64 and the hollow interior of the tubular shaft guide 65 to the outlet opening 54. A collar 68 defines the opening to the transverse chamber 56.

A plunger assembly 70 comprises a plunger 72 having a hollow interior in which is defined a pin opening 73 that is sized to receive a pin guide 74 in a press-fit relationship. A plunger spring 75 is received over the end of the of the pin guide extending through the pin opening 73 and is held in place by a cup 77 that is press-fit onto the end of the pin guide. A washer 78 is positioned around the exterior of the cup 77.

Figure 2:
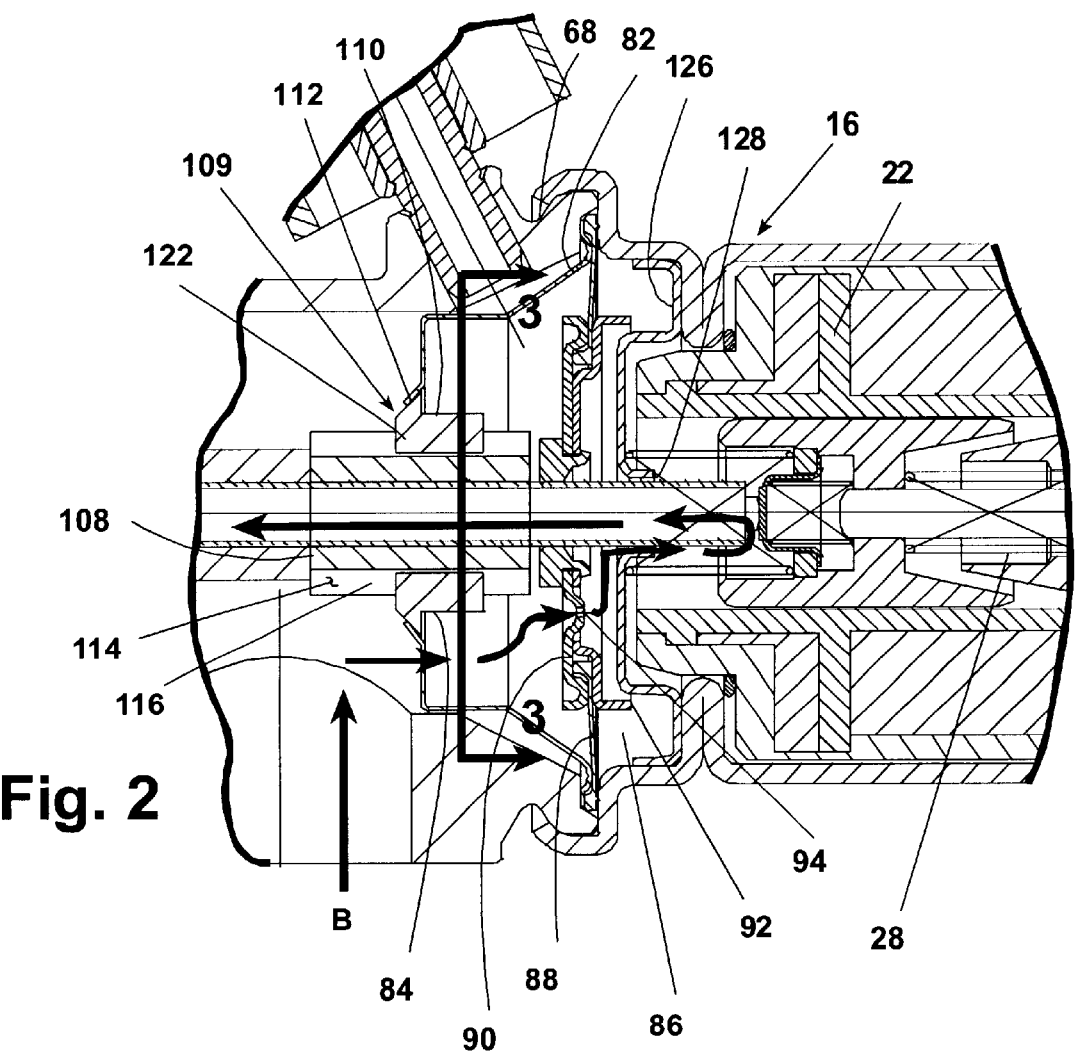
FIG. 2 is a sectional view taken along lines 2—2 of FIG. 1 illustrating the guide and sleeve of the dampener according to the invention.

Referring to FIGS. 1 and 2, a reciprocating valve assembly 80 comprises a mounting shield 82 that is sized to be received within the open end of the housing 50. The mounting shield 82 has a tapered portion that terminates in a cylindrical portion having a front face in which is defined an opening 84. A diaphragm assembly 86 comprises a diaphragm 88 sized to be received within the flared end of the mounting shield and sandwiched between opposing support disks 90, 92, which compressibly retain the diaphragm therebetween. The diaphragm 88 and the opposing support disks 90, 92 all have aligned annular openings. An equalizing passage 94 extends through the support disk 90 to fluidly connect the opposing sides of the diaphragm assembly 86.

Referring to FIGS. 1–5, a valve shaft assembly 100 comprises a hollow valve shaft 102 the hollow interior of which provides a fluid conduit 104. A valve body 106 is fixedly mounted to the valve shaft as is a support sleeve 108. An annular guide 109 is fixedly mounted to mounting shield 82.

Figure 4:
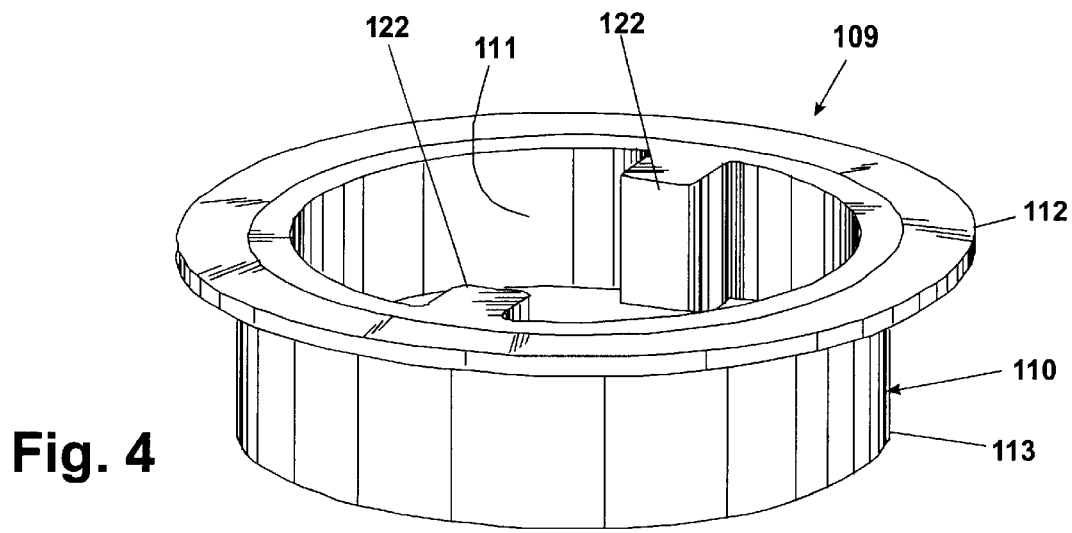
FIG. 4 is a perspective view of the guide.
Figure 5:
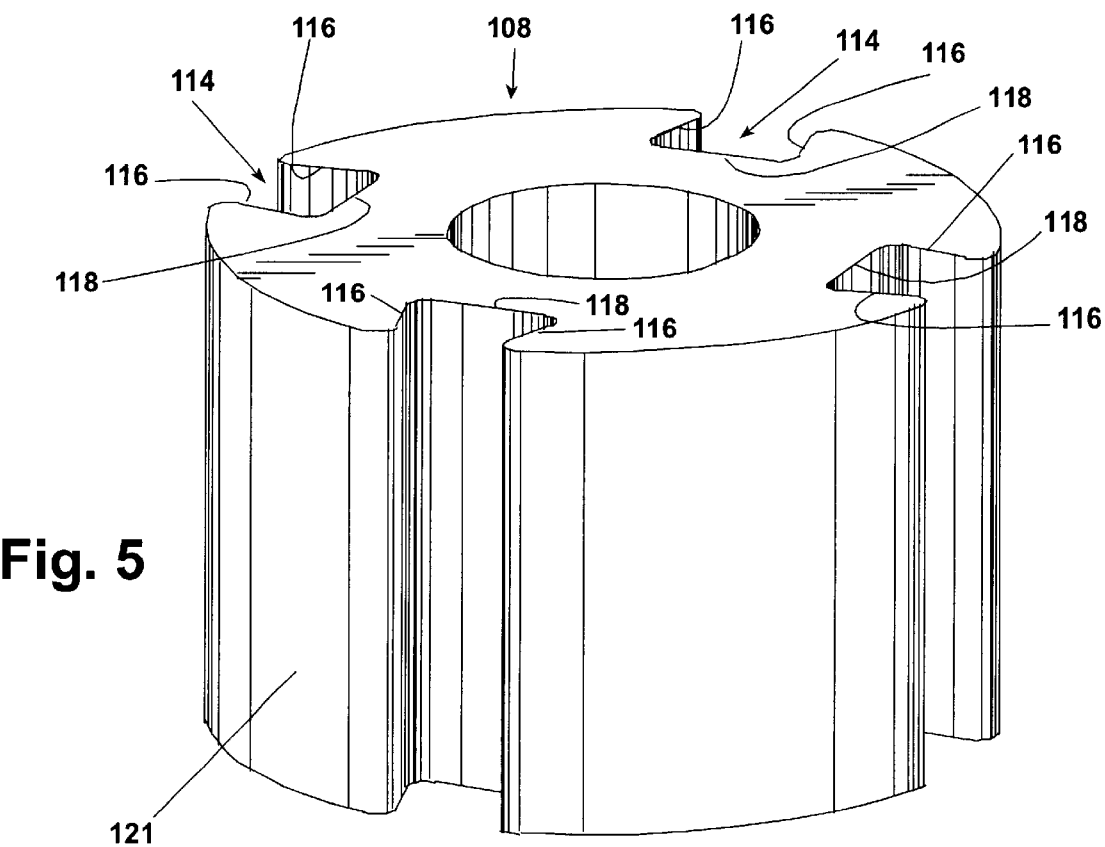
FIG. 5 is a perspective view of sleeve.

Referring to FIGS. 4 and 5 specifically and 1, 2 and 3 generally, the guide 109 and sleeve 108 together form the mechanism for retarding or dampening the reciprocation-induced forces of the valve shaft 102. The guide comprises an annular body 110 defining an inner or sleeve surface 111 and an outer surface 113. A tapered collar 112 extends from the body and is staked to the mounting shield 82. A pair of opposing ribs 122 project from the sleeve surface and sized to be received within the grooves 114 formed on the inner surface of the annular guide 109. The support sleeve 120 has an exterior or guide surface 121 in which multiple grooves 114 defined by diverging side walls 116 and bottom wall 118 are formed in the outer surface of the sleeve 108.

The sleeve 108 and guide 109 are preferably made from self-lubricating materials to reduce the friction between them during reciprocation. Suitable materials include plastics, such as nylon and Delrin™, or rubber. The sleeve 108 is preferably made from a fluorosilicone polymer having approximately a 70 durometer. The guide is preferably made from an acetal copolymer.

The assembly of the control valve 10 will now be described. It is worth noting that the assembly described herein is one of many possible approaches. Many of the various parts can be assembled in a different sequence than described and still result in a satisfactory control valve. To assemble the fluid control valve 10, the adjustment screw assembly 30 is assembled by inserting the adjustment screw 31 along with the O-ring 34 through the open end of the solenoid 12 into the guide mount 26 until the desired position is reached. The dust cap 36 is then inserted to seal off the open end of the adjustment screw 31. The solenoid 12 is then inserted into the housing; assembly 16 and a rear portion of the housing assembly 16 is rolled over onto a portion of the electrical connector 23 to secure the solenoid 12 within the housing assembly.

The plunger assembly is then mounted and a return spring 79 is slidably mounted over the pin 74 and partially received within the interior of the plunger 72. The pin is then inserted through the open end of the housing assembly so that the pin 74 is slidably received within the pin guide opening 32 compressing the spring between the plunger 72 and the guide mount 26.

The valve 14 is assembled by pressing the shaft guide 65 into the blind mounting opening 64 so that the fluid path is formed through the inlet bypass opening 66 in the hollow interior of the shaft guide 65. A bias spring 124 is slidably mounted over the shaft guide 65.

The reciprocating valve assembly 80 is assembled by inserting the valve shaft 102 through the aligned apertures in the mounting shield 82 and the diaphragm assembly 86 so that the ribs 122 of the guide 109 are slidably received within the slots 114 on the sleeve 108. The assembled reciprocating valve assembly 80 is then inserted into the open end of the housing 50 where the end of the valve shaft 102 is slidably received within the hollow interior of the bias spring 124 and the hollow interior of the shaft guide 65 to compressibly retain the bias spring 114 between the closed end of the housing 50 and the valve body 106. A cap 126 having a central opening 128 that functions as a bearing for the shaft is then slid over the valve shaft 102 so that one end of the valve shaft passes through the opening 128.

The assembled valve 14 is then inserted into the valve side of the housing assembly until the cap 126 is received within a reduced diameter portion of the housing assembly. An outer annular flange of the housing assembly is then rolled over the collar 68 to retain the housing 50 in fixed relationship to the housing assembly 16.

When assembled, the fluid control valve 10 defines two fluid paths as indicated by arrows A and B from the valve inlet 52 to the valve outlet 54 to fluidly connect the high pressure side with the low pressure or suction side. The first fluid path A passes through the inlet 52, the valve seat 58, and the outlet 54. Fluid can only pass through the fluid path A when the valve body 106 is unseated with respect to the valve seat 58. The fluid path B is defined by the inlet 52, equalizing passage 94, fluid conduit 104 of the valve shaft 102, bypass passage 66, and outlet 54. Fluid can only pass through the fluid path B when the solenoid end of the valve shaft 102 is not in abutting relationship with the cup 77.

The operation of the fluid control valve 10 will now be described with respect to FIG. 1. In steady state conditions, the bias spring 124 has sufficient force to bias the valve shaft 102 so that its solenoid end is in abutting relationship with the plunger cap 77 to close or prevent fluid flow through fluid path B and the valve body 106 abuts a valve seat 58 to close and prevent fluid flow along fluid path A. As there is a demand for bypass air, an electrical current is increased to the coil 18 of the solenoid 12. The electromagnetic force created by the coil 18 draws the plunger assembly 70 towards the guide mount 26 moving the plunger cap 77 from contact with the solenoid end of the valve shaft and opening fluid path B to fluidly connect the low pressure of the outlet 54 to the solenoid side of the diaphragm assembly 80 and eventually the inlet 52. Pressure from the inlet 52 attempts to equalize the low pressure created on the solenoid side of the diaphragm assembly 80 through the equalizing passage 94. However, because of the relatively small size of the equalizing passage 94, there is not simultaneous equalization of the pressures on opposite sides of the diaphragm. Therefore, the greater pressure on the valve body side of the diaphragm (caused by the pressure in the inlet or the opening of fluid path B) moves the diaphragm toward the solenoid and along with it the valve shaft 102. As the valve shaft 102 moves towards the solenoid, the valve body 106 unseats from the valve seat 58 and permits fluid flow along path A, which influences the magnitude of the low pressure in the outlet 54 by increasing the pressure, which further tends to equalize the pressure across the diaphragm by the fluid connection through the fluid conduit 104 of the valve shaft 102.

If the pressure differential across the diaphragm assembly 86 is great enough, the diaphragm end of the valve shaft 102 will once again abut the cup 77 of the plunger assembly and the pressure differential across the diaphragm will be equalized by fluid passing through the equalization passage 94, realizing that the low pressure is being simultaneously equalized by the passage of air between the inlet 52 and the outlet 54. Typically, the solenoid is controlled in such a manner that when this occurs the plunger assembly is drawn further toward the solenoid to open the fluid path B. If the diaphragm end of the valve shaft 102 is not closed by the plunger assembly, then both fluid paths A and B are open and the pressure differential across the diaphragm is reduced by fluid flowing along both paths. As the pressure differential is decreased, the diaphragm moves towards the valve side of the fluid control valve 10, until the valve body 106 re-seats with the valve seat 58. Small pressure differentials can be equalized by the fluid flow through path B as the diaphragm has a range of movement before the valve body unseats. Larger pressure differentials require the opening of fluid path A.

During normal operations, the movement of the valve shaft 102 occurs very rapidly, especially for small pressure differentials, and can result in vibrations capable of skewing the reciprocating axis of the valve shaft. In accordance with the invention, the reciprocation of the valve shaft is accomplished without any detrimental vibration. The ribs 122 of the guide remain within the grooves 114 of the sleeve mounted to the shaft. In essence, the interaction of the sleeve and the guide permit the reciprocation of the shaft while substantially prohibiting radial movement of the shaft. The limited radial movement of the valve shaft retards and/or dampens any valve shaft vibrations. Advantageously, since there is no direct contact between the shaft and the guide, there is no undesirable wear of the shaft.

Figure 3:
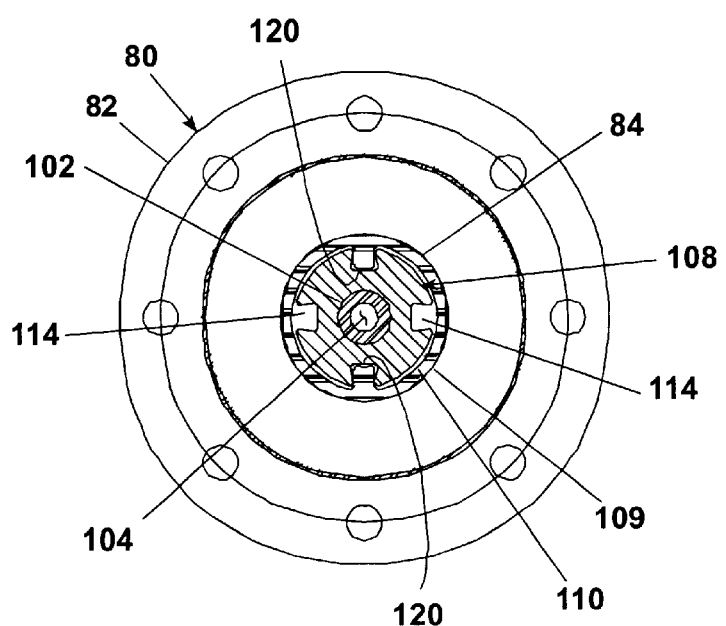
FIG. 3 is a sectional view of the guide and sleeve.

Preferably, the guide slots and sleeve ribs are sized so that there is no contact between these elements other than when there are no vibrations. The guide slots and sleeve ribs can contact. If so, it is preferred that the contact occur only to the extent necessary to prohibit the vibration of the shaft in response to its reciprocation since the greater the contact area between the slots and the ribs will increase the sliding resistance between the guide and sleeve, which may adversely impact the performance of the valve. The contact area and, thus, the sliding resistance between the guide and the sleeve can be controlled by the shape of the slots. As is best seen in FIGS. 2 and 3, the slots preferably diverge from their opening to the interior of the guide so that only the most narrow portion of the slot makes any contact with the ribs. If it is desirable to increase the sliding resistance between the guide and the ribs, the side walls of the slot need only be changed so that a greater surface area of the side walls contact the ribs. Alternatively, the ribs could be shaped to conform to the side wall shape; but, this not preferred.

It is also within the scope of the invention for the guide 109 to have multiple sets of slots with differing side wall configurations so that one set of slots has more surface area in contact with the sleeve ribs 122 to permit easy adjustment of the sliding resistance in response to the particular operating environment.

While the invention has been specifically described in connection with certain specific embodiments thereof, it is to be understood that the description of the invention for illustration and should not be considered to be a limitation of the invention, and the scope of the appended claims should be construed as broadly as the prior art will permit.

What is claimed is:

1. A valve for controlling the flow of fluid through a conduit connecting an upstream portion with a first fluid pressure and a downstream portion with a second fluid pressure, the valve comprising:

a valve housing defining a fluid passage having an inlet adapted to be fluidly connected to the upstream portion of the conduit and an outlet adapted to be fluidly connected to the downstream portion of the conduit, a valve seat disposed within the fluid passage, a first annular bearing located on the upstream side of the valve seat, and a second annular bearing located on the downstream side of the valve seat;

a valve assembly comprising an elongated shaft having a first end slidably mounted within the first annular bearing and a second end slidably mounted within the second annular bearing for reciprocal movement within the passage along a longitudinal axis of the elongated shaft, and a valve body mounted on the shaft and moved into and out of contact with the valve seat in response to the reciprocation of the shaft to fluidly close the passage when the valve body contacts the valve seat and fluidly open the passage when the valve body is spaced from the valve seat; and a dampening mechanism comprising a guide mounted to the valve housing and having an inner surface defining a sleeve opening axially aligned with the shaft longitudinal axis and circumscribing the shaft, and a sleeve mounted to the shaft and having an outer surface shaped to be slidaby received within the sleeve opening, wherein the sleeve and guide are made from a self-lubricating material and movement of the shaft in a direction transverse from the shaft longitudinal axis results in contact between at least a portion of the sleeve and a portion of the guide to thereby retard the movement of the shaft in a direction other than along the shaft longitudinal axis.

2. The control valve according to claim 1 wherein one of the inner surface of the sleeve and outer surface of the guide has a rib projecting therefrom and the other of the sleeve inner surface and guide outer surface has a grooved formed therein, wherein the rib is received within the groove and the rib contacts a portion of the groove when the shaft moves in a direction transverse to the shaft longitudinal axis.

3. The control valve according to claim 2 wherein there are multiple pairs of corresponding ribs and grooves.

4. The control valve according to claim 3 wherein the groove is formed in the sleeve and the rib projects from the guide and the groove has opposed diverging side walls extending from the sleeve outer surface into the sleeve to define a open top for the groove in which the rib is received.

5. The control valve according to claim 4 wherein the cross-sectional width of the open top is greater than the cross-sectional width of the rib at the open top when the rib is received within the groove.

6. The control valve according to claim 5 wherein the groove further comprises a bottom wall connecting the diverging side walls to define the groove with a cross-sectional profile having an increasing width from the open top to the bottom wall.

7. The control valve according to claim 6 wherein the rib has a substantially constant-width cross-sectional profile.

8. The control valve according to claim 7 wherein the groove has a cross-sectional profile with a varying width.

9. The control valve according to claim 8 wherein the groove varying width has a minimum width portion and the rib has a cross-sectional width less than the groove minimum width.

10. The control valve according to claim 1 wherein the sleeve is sized such that the sleeve is received within the guide without the sleeve outer surface contacting the guide inner surface.

11. The control valve according to claim 1 wherein the sleeve includes an axial opening sized to frictionally receive the shaft to press-fit the sleeve to the shaft.

12. The control valve according to claim 1, and further comprising a mounting shield mounted to the valve housing and having an guide mounting opening in which the guide is slidably received to mount the guide to the valve housing.

13. The control valve according to claim 12 wherein the guide comprises an annular body with an exterior surface and a shoulder extending from the annular body and projecting beyond the annular body outer surface, the annular body being slidably received with the mounting shield opening, and the shoulder abutting the mounting shield to locate the position of the guide relative to the mounting shield.

14. The control valve according to claim 13 wherein the shoulder is attached to the mounting shield to fix the guide in the located position.

15. A valve for controlling the flow of fluid through a conduit connecting an upstream portion with a first fluid pressure and a downstream portion with a second fluid pressure, the valve comprising:

a valve housing defining a fluid passage having an inlet adapted to be fluidly connected to the upstream portion of the conduit and an outlet adapted to be fluidly connected to the downstream portion of the conduit, and a valve seat disposed within the fluid passage;

a valve assembly comprising an elongated shaft slidably mounted to the housing for reciprocal movement within the passage along a longitudinal axis of the elongated shaft, and a valve body mounted on the shaft and moved into and out of contact with the valve seat in response to the reciprocation of the shaft to fluidly close the passage when the valve body contacts the valve seat and fluidly open the passage when the valve body is spaced from the valve seat; and a dampening mechanism comprising:
    a guide mounted to the valve housing and having an inner surface defining a sleeve opening axially aligned with the shaft longitudinal axis and circumscribing the shaft,
    and a sleeve mounted to the shaft and having an outer surface shaped to be slidaby received within the sleeve opening,
wherein one of the inner surface of the sleeve and the outer surface of the guide has a rib projecting therefrom and the other of the sleeve inner surface and guide outer surface has a grooved formed therein, wherein the rib is received within the groove and the rib contacts a portion of the groove when the shaft moves in a direction transverse to the shaft longitudinal axis to thereby retard the movement of the shaft in a direction other than along the shaft longitudinal axis.

16. The control valve according to claim 15 wherein there are multiple pairs of corresponding ribs and grooves.

17. The control valve according to claim 16 wherein the groove is formed in the sleeve and the rib projects from the guide and the groove has opposed diverging side walls extending from the sleeve outer surface into the sleeve to define an open top for the groove in which the rib is received.

18. The control valve according to claim 17 wherein the cross-sectional width of the open top is greater than the cross-sectional width of the rib at the open top when the rib is received within the groove.

19. The control valve according to claim 18 wherein the groove further comprises a bottom wall connecting the diverging side walls to define the groove with a cross-sectional profile having an increasing width from the open top to the bottom wall.

20. The control valve according to claim 19 wherein the rib has a substantially constant-width cross-sectional profile.

21. The control valve according to claim 15 wherein the groove has a cross-sectional profile with a varying width.

22. The control valve according to claim 21 wherein the groove varying width has a minimum width portion and the rib has a cross-sectional width less than the groove minimum width.

23. The control valve according to claim 15 wherein the sleeve is sized such that the sleeve is received within the guide without the sleeve outer surface contacting the guide inner surface.

24. The control valve according to claim 15 wherein the sleeve includes an axial opening sized to frictionally receive the shaft to press-fit the sleeve to the shaft.

25. The control valve according to claim 15, and further comprising a mounting shield mounted to the valve housing and having a guide mounting opening in which the guide is slidably received to mount the guide to the valve housing.

26. The control valve according to claim 25 wherein the guide comprises an annular body with an exterior surface and a shoulder extending from the annular body and projecting beyond the annular body outer surface, the annular body being slidably received with the mounting shield opening, and the shoulder abutting the mounting shield to locate the position of the guide relative to the mounting shield.

27. The control valve according to claim 26 wherein the shoulder is attached to the mounting shield to fix the guide in the located position.

* * * * *